(12) United States Patent
Ogilvie

(10) Patent No.: US 8,661,528 B2
(45) Date of Patent: *Feb. 25, 2014

(54) PROVIDING NOTICE OF PATENT AND OTHER LEGAL RIGHTS

(75) Inventor: John W. Ogilvie, Salt Lake City, UT (US)

(73) Assignee: Lot 27 Acquisition Foundation, L.L.C, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,569

(22) Filed: Jun. 14, 2012

(65) Prior Publication Data

US 2012/0260332 A1 Oct. 11, 2012

Related U.S. Application Data

(63) Continuation of application No. 11/941,821, filed on Nov. 16, 2007, now Pat. No. 8,239,935, which is a continuation-in-part of application No. 11/532,514, filed on Sep. 16, 2006, which is a continuation of application No. 10/263,548, filed on Oct. 2, 2002, now Pat. No. 7,130,830.

(60) Provisional application No. 60/866,236, filed on Nov. 17, 2006, provisional application No. 60/327,889, filed on Oct. 9, 2001.

(51) Int. Cl.
 *G06F 21/00* (2013.01)
 *G06F 7/04* (2006.01)
 *G06F 17/30* (2006.01)
 *H04N 7/16* (2011.01)
 *G06Q 20/00* (2012.01)

(52) U.S. Cl.
 USPC ............... 726/17; 726/26; 705/59; 705/80

(58) Field of Classification Search
 None
 See application file for complete search history.

(56) References Cited

U.S. PATENT DOCUMENTS

| 5,359,659 A | * 10/1994 | Rosenthal .................. 726/24 |
| 6,119,108 A | 9/2000 | Holmes et al. |
| 6,138,119 A | 10/2000 | Hall et al. |

(Continued)

FOREIGN PATENT DOCUMENTS

WO 0197049 12/2001

OTHER PUBLICATIONS

Samuelson. "The Never Ending Struggle for Balance." Communications of the ACM, vol. 40, No. 5, pp. 17-21, May 1997, ISSN: 0001-0782.

(Continued)

*Primary Examiner* — Shin-Hon Chen
(74) *Attorney, Agent, or Firm* — Turocy & Watson, LLP

(57) ABSTRACT

A system for providing notice of legal rights corresponding to a computing device includes presenting a notice to the user through an I/O interface. The notice is in response to an attempt by a user to access at least one feature of the device through the I/O interface of the device and the notice further indicates that the device is subject to legal rights under a legal instrument. An acknowledgement of the legal rights is presented through the I/O interface. If the user selects the acknowledgement, the user is allowed to access at least one feature of the device. The user is prevented from accessing the at least one feature of the device if the user does not select the acknowledgement.

25 Claims, 1 Drawing Sheet

(56) References Cited

U.S. PATENT DOCUMENTS

| | | | |
|---|---|---|---|
| 6,171,112 | B1 | 1/2001 | Clark et al. |
| 6,330,670 | B1 | 12/2001 | England et al. |
| 6,356,903 | B1 | 3/2002 | Baxter et al. |
| 6,389,458 | B2 | 5/2002 | Shuster |
| 7,031,943 | B1* | 4/2006 | James et al. .............. 705/59 |
| 7,082,399 | B2 | 7/2006 | Utsumi |
| 7,383,233 | B1* | 6/2008 | Singh et al. .............. 705/80 |
| 7,426,750 | B2* | 9/2008 | Cooper et al. ............. 726/26 |
| 2001/0047338 | A1* | 11/2001 | Jones ....................... 705/51 |
| 2002/0023018 | A1* | 2/2002 | Kleinbaum ................ 705/26 |
| 2002/0082937 | A1* | 6/2002 | Retherford ................ 705/26 |
| 2002/0128849 | A1* | 9/2002 | Wheelock .................. 705/1 |
| 2002/0165726 | A1 | 11/2002 | Grundfest |
| 2002/0178015 | A1* | 11/2002 | Zee ........................... 705/1 |
| 2003/0023528 | A1 | 1/2003 | Wilce et al. |

OTHER PUBLICATIONS

Sandburg. "Fair Use Fears Over Circuit Ruling." In: The Recorder, from www.law.com website, Oct. 8, 2002.

Hamblett. Internet Users Not Bound by Hidden Liscense Agreements. In: Newyork Law Journal, Oct. 2, 2002.

Screenshot of Legal notice in Microsoft Word 2000 (9.0.3821 SR-1), version update published Oct. 16, 2002, retrieved on Nov. 19, 2002, 1 page.

Harmon. Patents and the Federal Circuit (5th Ed.), pp. 542-549; Published by: BNA Books, Washington, D.C., Aug. 2001.

Lundberg, et al. Electronic and Software Patents: Law and Practice, pp. 457-460; Published by: BNA Books, Washington, D.C., Jul. 2000.

Office Action Dated Sep. 11, 2008 for U.S. Appl. No. 11/532,514, 16 pages.

Final Office Action mailed Mar. 10, 2009 for U.S. Appl. No. 11/532,514, 24 pages.

Office Action dated Jan. 5, 2012 for U.S. Appl. No. 11/941,821, 14 pages.

Office Action dated Mar. 28, 2011 for U.S. Appl. No. 11/941,821, 19 pages.

Office Action dated Feb. 29, 2012 for U.S. Appl. No. 11/941,821, 9 pages.

Office Action dated Oct. 14, 2011 for U.S. Appl. No. 11/941,821, 16 pages.

Office Action dated Oct. 28, 2010 for U.S. Appl. No. 11/941,821, 26 pages.

* cited by examiner

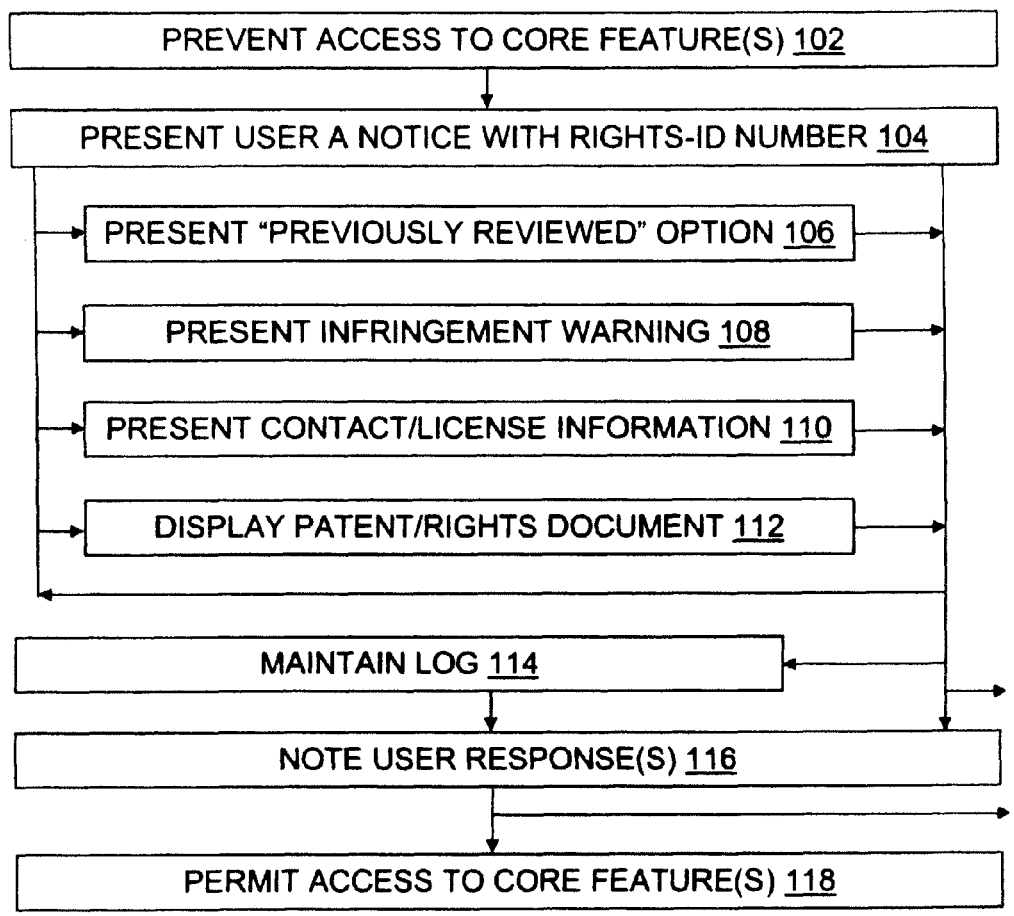

PROVIDING NOTICE OF PATENT AND OTHER LEGAL RIGHTS

RELATED APPLICATIONS

This application is a continuation of U.S. patent application Ser. No. 11/941,821, filed Nov. 16, 2007, now U.S. Pat. No. 8,239,935 which claims the benefit of U.S. Patent Application No. 60/866,236, filed on Nov. 17, 2006, and which is a continuation-in-part of U.S. patent application Ser. No. 11/532,514, filed Sep. 16, 2006, which is a continuation of U.S. patent application Ser. No. 10/263,548, filed Oct. 2, 2002, now issued as U.S. Pat. No. 7,130,830, which claims the benefit of U.S. Patent Application No. 60/327,889, filed on Oct. 9, 2001. The aforementioned '236, '514, '548 and '889 applications are each incorporated herein by reference in their entireties.

FIELD OF THE INVENTION

The present invention relates generally to the notification of legal rights, and more particularly, relates to tools and techniques for notifying a user of a patented or otherwise protected system or method before the user is allowed to use the system or method.

BACKGROUND OF THE INVENTION

Click-through agreements (e.g., beta license agreements, non-disclosure agreements, end user license agreements) are often presented to users in a manner that prevents user access to core system features of a software program unless and until the user agrees to the terms and conditions of the agreement. The proposed agreement is presented to the user along with buttons labeled "I AGREE" and "I DO NOT AGREE" or the like. The user has an opportunity to review the agreement, and could even pick up the phone or otherwise contact and consult with counsel. If the user clicks the "I DO NOT AGREE" button, the user is denied access to core system features of the program or computer system; if the user clicks the "I AGREE" button, the user is given access to the features.

Sometimes a click-through agreement lists patent numbers within the text of the agreement. While click-through agreements generally want the user to confirm that the user has seen the patent before allowing the user to access core features of the program or system, such click-through arrangements generally do not include the actual text of the patent nor are such agreements typically configured to present the actual patent text identified as covering the software program or system. Also, click-through agreements are related to software and do not indicate legal instruments covering use of a specific computing device.

BRIEF SUMMARY

An embodiment of the present invention contemplates a method for providing legal notice of legal rights corresponding to a computing device and includes in response to an attempt by a user to access at least one feature of the device through an I/O interface of the device, presenting a notice to the user, through the I/O interface. The notice indicates that the device is subject to legal rights under a legal instrument. An acknowledgement of the legal rights is presented through the I/O interface. The user is allowed to access at least one feature of the device if the user selects the acknowledgement. The user is prevented from accessing the at least one feature of the device if the user does not select the acknowledgement.

According to another embodiment, a computing device provides notice of legal rights corresponding to the computing device that includes a presenting module configured to, in response to an attempt by a user to access features of the device through an I/O interface of the device, present a notice to a device user, through the I/O interface. The notice indicates that the device is subject to legal rights under a legal instrument. An acknowledgement module is configured to present, through the I/O interface, an acknowledgement of the of the legal rights. An access module is configured to allow the user to access at least one feature of the device if the user selects the acknowledgement. A prevention module is configured to prevent the user from accessing the at least one feature of the device if the user does not select the acknowledgement.

According to another embodiment, tools and techniques provide notice of patent rights by limiting access to a computer system user to use core system features until the user has been advised that at least a portion of those features or certain uses of those features are covered by one or more identified patents. A computer system user can also be shown the one or more identified patents, or have otherwise been given notice, before being allowed access to core system features. The core system features may be patented, or unpatented but highly desired provided the patent is not misused.

According to another embodiment, the present invention also contemplated providing actual notice of other legal rights, including without limitation, other intellectual property rights, such as, copyright, trademark, or trade secret rights.

BRIEF DESCRIPTION OF THE DRAWINGS

The foregoing and other advantages of the invention will become apparent upon reading the following detailed description and upon reference to the drawing.

FIG. 1 is a flowchart illustrating a system and method for allowing access to core features of a system in accordance with embodiments of the invention.

DETAILED DESCRIPTION

While this invention is susceptible of embodiment in many different forms, there is shown in the drawing and will herein be described in detail certain embodiments of the invention with the understanding that the present disclosure is to be considered as an exemplification of the principles of the invention and is not intended to limit the broad aspect of the invention to the embodiments illustrated.

FIG. 1 illustrates a system and method in which a user of a computer program or device is initially limited in accessing 102 at least one feature of the program or device. A limit on access may be implemented using familiar access control barriers, such as, for example, authentication processes used to implement password-controlled access, certificate-controlled access, and other methods or device for identity-controlled access. Access to device functions can be controlled to enforce a notice of patent(s) or other legal rights. In certain embodiments, some of the feature described herein can be combined with access controls that enforce certain limitations on the identity of users. Some of the feature described herein can also be used separately or remotely from identity-based access controls.

When attempting to access a device function, a user can be presented 104 with a notice statement such as "This product is covered by U.S. Pat. No. _____", for which the blank underlined space can be substituted with an actual patent number. Other controlling elements, such as additional patent numbers or other legal devices, can also be presented in the notice statement 104. The preface, "This product is covered by", provides an example of language that may be presented to a user and may be worded differently or omitted. The patent number may be plain text, or it may be active text such as a hyperlink or button, so that selecting or clicking on it enables a copy of the patent to be displayed 112 to the user of the program or device. Copyright, trademark and other notices may be included with the patent notice that is presented 104 to the user.

Through the use of an implicit command sequence, an explicit button, other active text, or some user selection or action, the user can be directed 116 to the core features 118 of the computer program or device after the user has seen the patent(s) or other controls identified in the notice statement. In certain embodiments, the notice statement 104 may be accompanied 106 by a statement or selectable item that allows acknowledgement of a previous receipt of notice. The statement may say, for example, "I have previously reviewed all those patents" or "I've already looked at U.S. Pat. No. _____. Thanks." In certain embodiments, an implicit command sequence, an explicit button, other active text, or some user selection or action can direct 116 the user to the core features 118 of the computer program or device after the user has acknowledged 116 previously reviewing the identified patents. For example, the user can be asked to confirm that he understands the legal meaning of the legal instruments, such as the scope of claims in a patent. The user may also be asked to confirm that he understands that use of the device constitutes infringement of the rights represented by the legal instrument.

In certain embodiment, there is an acknowledgement option for the user to select that the notice was "previously reviewed" 106. When this option 106 is selected or chosen in response 116 to a prompt, there is a possibility that the user has not actually previously reviewed or seen the patent(s) identified in the notice, or for various reasons, does not want to review the patent(s) at this time. In one embodiment, copies of the patent are emailed 112 to the user despite the user selecting the option of not wanting to review the patent(s). In another embodiment, copies of the patent(s) are printed 112 in response to the user selecting the "previously reviewed" option. In certain embodiments, the user's representation in the response is accepted 116 at face value, and the process continues by giving the user access to the core features 118 of the computer program or device. While the embodiments described herein may limit the access of a user to core features of a computing device, the users generally desires to gain access to the core feature of the device. If the user actively represents 116 that the user has previously seen the patent, but has not actually done so, the user has misrepresented having seen the patent. A holder of the patent(s) identified in the notice can find the embodiments described herein useful in an enforcement proceeding to show that the user received actual notice of the patent(s), and thus, reduce the strength of an argument by the user that no notice was received. Furthermore, the embodiments described herein can also provide an argument that the user made an affirmative misrepresentation in an effort to gain access to the patented system's functionality.

A notice statement 104 may be accompanied by an infringement warning 108. For example, the user may be shown, for example, a statement that if the user is not properly licensed and does not own the patent right(s) (or other elements) in question, then use of the program or device is an infringing use. In a further embodiment, a user may be assisted 110 in determining whether or not the user is properly licensed. For instance, contact information for the patentee may be provided 110 to permit a user to inquire of the program's vendor whether or not the user is properly licensed in the user use of the program or device. The name of the licensee may also be displayed 110, so the user is on notice of infringement if the displayed licensee name is not the user's name.

In further exemplifications, the notice statement 104 may be accompanied by a statement 108 that, if the user is not properly licensed and does not own the noticed rights in question, the making of copies of the patented program or use of the device may constitute contributory or direct infringement of the patent owner's rights. For example, if a noticed patent contains claims for media configured to operate according to a specified method, the making of such configured media can be a direct infringement. If the patent only claims methods that are performed by the software, and does not claim copying media configured to perform such methods, then the infringement from copying the program onto other disks, RAM, etc. could be interpreted to be a contributory infringement.

FIG. 1 identifies and describes various embodiments including notice step(s) 104, 106, 108, 110, 112 and access control steps 102, 116, 118, which can be applied at various stages in the use of a computer program or device. For example, the steps, in varying combinations where desired, can be performed on the first or subsequent attempted uses of the device by a particular user.

Access control can also be performed every time a computing device is run or operated. The device may keep an internal log 114 or send usage information 114 over a network connection to the vendor of the program or device. Other indications that a user used or ran the access controlled device may come from the user, who during operation of the program or device received certain knowledge disclosed, for example, in the presentation of rights 112 step, the notice step 104 or after an acknowledgement or response 116 step. Other verification procedures can also be used to verify whether a user received notice of the patent associated with the program or device.

The present disclosure extends beyond the conventional marking requirements, such as the marking requirements described in 35 U.S.C. §287. In addition to identifying the patent number (or other identification, such as a government issued registration number) in the described notice procedures, a user can also be provided with the option to view the patent itself before accessing the core features of the device. In certain embodiments, access to the features of a device may be denied to a user until the patent (or other controlling right) is displayed to the user and/or the user is notified that unlicensed use of the device constitutes infringement.

Actual notice of infringement of patent in the U.S. is typically handled by sending an alleged infringer a letter with a copy of the patent, a statement identifying the alleged infringer's accused device or process, and a statement to the effect that patentee believes the accused device or process infringes the enclosed patent. Sometimes the patent is not included with the letter sent to the alleged infringer and is only identified by a patent number. The accused device is often a device that draws sales away from the patent owner's device.

The embodiments described herein provide a way of placing notices of the patent owner's rights on or within the patent owner's product that include language specifying that unlicensed uses of that product infringe certain controlling rights. The accused device can be an illegally made or otherwise improperly used copy of the patentee's own device (e.g., a program or system, such as a personal computer, or network elements configured with the program). Actual notice of the patent owner's rights is not handled in the form of a letter sent to a specific alleged infringer. Instead, the notice is displayed by software and/or hardware, such as, for example, a computer, personal electronics device, consumer electronics device, tool, etc. The type of device that may display the notice of the patent owner's rights may be similar to the device used by licensed user of the program or device. The display of the notice of controlling rights 104 as described, for example, in the embodiments of this disclosure can be interpreted as providing actual notice to an unauthorized user of the program or device and may have significant bearing in any actions maintained by the patent owner against an unauthorized party.

The application of the disclosures presented herein increase the difficulty for an alleged violator of the controlling rights to successfully argue they had no knowledge of the patent, or other legal instrument, and its coverage of the program or device, particularly in instance in which the alleged violator used the core features of the program or device. In certain embodiments, the device is configured so that it can only be used after the user has: (a) been presented with the patent or other instrument and had a chance to review the instrument before being given access to the device's core features; (b) affirmatively represented and acknowledged that the user has previously reviewed the instrument and understands that the instrument covers at least some of the device's features; or (c) actively evaded the program code/hardware restrictions that present the patent notice, e.g., by jumping around it inside a debugger or physically tampering with the hardware.

In certain embodiments, other documents can be displayed 112 to a user in lieu of, or in addition to, the noticed patent(s), particularly other documents that have similar notice requirements.

The program or device disclosed herein can be useful for showing that a party who attempts to gain access 118 to a particular computer software and/or hardware technology has been given shown 112 a particular legal instrument before access 118 to the core features of the technology is allowed. Access 118 to the technology may be consideration (in the contractual sense) given in return for reviewing and acknowledging review 116 (or opportunity therefore) of the legal instrument displayed 112 to the party, and vice versa.

In some embodiments, a log is maintained 114 in a file stored on a local machine by code from a DLL or other library module within the program for which the patented core features are being controlled. For example, a library code or another part of the program can enter information into the log, such as, the time and date, the patent documents offered for display 112, the user's response (e.g., view, assert already viewed), and user identifying information (e.g., username, actual name, IP address, MAC address, etc.). Information that is logged or that is stored for future logging may be encrypted and/or digitally signed to help ensure the integrity of the information.

In some embodiments, the log is can also be maintained 114 on a server that is located remote to the program or device for which access to the core features are being protected. Information, such as the log information described herein, can be logged by sending it through a network. For example, certain embodiments include passing log information in the form of parameters in a web bug network communication. Web bug communications are routinely used by web analytics companies such as Omniture and Google Analytics to track website usage. Geolocation technology may also be used to determine an approximate geographic location of the online user who is requesting access to the core features; such geographic location may also be logged 114. Log information that is remotely stored can further be encrypted and/or digitally signed.

In some embodiments, logging 114 can be provided on a subscription basis with payments made, for example, by subscribers to a service provider on a periodic basis (e.g., X dollars per month), a transaction basis (e.g., Y dollars per hundred log entries made), a head count basis (e.g., Z dollars per unique user logged), or a combination thereof. Access to logs can be by authorized subscribers only. In certain embodiments, a service provider's authorized personnel may access logs. In another embodiment, a log has read-only access.

In some embodiments, patent owner name(s), inventor name(s), and/or other search parameters, as recognized, for example, by the U.S. Patent and Trademark Office's search interface located at www.uspto.gov, can be entered as parameters to the access control features disclosed herein. The search parameters can be entered by an administrator, in place of or in addition to a list of patent document numbers. In certain embodiments, an additional step can be added in which official databases, such the one provided by the U.S. Patent and Trademark Office, are dynamically searched for pertinent patent documents to display 104 to the party seeking access to the program or device. Furthermore, the title, an abstract, selected Figure(s), and/or additional information can be dynamically (e.g., in response to a user attempt to access core features) extracted from patent document(s) retrieved via the search engines on the official governmental databases of patents, published patent documents, etc. The retrieved data can the be formed into a checklist that may be presented 104 to the party desiring access to the program or device. Patents which have expired can be automatically filtered out and not presented 104. Such automation through the use of search engine results of databases can reduce the burden of maintaining an up-to-date presentation of patent rights 104, particularly as patent documents are added or removed (e.g., newly issued, expired, assigned, etc.) from a subscriber's portfolio.

In some embodiments, user identity and/or the location (e.g., network, geographic) where a user attempts to access core features of a program or device is compared against a list, table, map, or other structure that identifies users or locations that have their access allowed and/or disallowed. For example, illegal copies and/or uses of a patented product may be detected. Administrators and/or appropriate parties can be notified automatically, so that suitable legal measures can be taken to limit, stop, and/or deter infringement. In certain embodiments, the comparison of a user/location with a structure may be performed after, during, and/or before logging 114 the user identity and/or the location.

The invention may be embodied in various ways, e.g., processes and/or hardware on a server computer, on a client or peer, or on a standalone computer, software (data instructions) in RAM or permanent storage for performing a process, general purpose computer hardware configured by software, special-purpose computer hardware, log data produced by a process, and so on. Computers, PDAs, cell phones, or any device having a user interface and/or network transmission capabilities may be included in the embodiments disclosed herein. Touch screens, keyboards, other buttons, levers, microphones, speakers, light pens, sensors, scanners, and other I/O devices may be configured to facilitate or perform operations to achieve the methods and systems, and method results, which are described herein. Various combinations thereof may also be incorporate into embodiments of the present disclosure.

Terms such as "computer" refer to devices having a microprocessor and memory, not merely to personal computers or servers. "Electronic" refers to digital and/or analog electronic circuitry. "Automatic" means without requiring ongoing real-time human input or guidance to perform the immediately contemplated operation.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented herein along with programming languages and tools, such as, C++, C, Java, Pascal, APIs, SDKs, assembly, firmware, microcode, and/or other languages and tools.

Although particular embodiments of the present invention are expressly illustrated and described herein, it will be appreciated that discussion of one type of embodiment also generally extends to other embodiment types. For instance, the description of the methods illustrated in FIG. 1 also helps describe systems which operate according to those methods, comprising a combination of standard components (e.g, processors, screens) and configuring components (e.g., software, circuitry according to the specific steps illustrated). All claims as filed are part of the specification and thus help describe the invention, and repeated claim language may be inserted outside the claims as needed.

As used herein, terms such as "a" and "the" and designations such as "displaying" and "statement", are inclusive of one or more of the indicated item or step. For example, a reference in the claims to an item generally refers to at least one such item being present and a reference to a step refers to at least one instance of the step being performed.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope to the full extent permitted by law.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

The invention claimed is:

1. A method, comprising:
   determining a device is an illegal copy of the device including identifying at least one characteristic of the device;
   presenting, via an interface of the illegal copy of the device, a notice indicating that the illegal copy of the device is subject to one or more legal rights based on at least one patent, the presenting being in response to an attempt to access at least one function of the illegal copy of the device; and
   granting access to the at least one function of the illegal copy of the device based, at least, on receiving an indication of an acknowledgement of knowledge of the one or more legal rights.

2. The method of claim 1, wherein the acknowledgment of knowledge includes an acknowledgment that the at least one patent has been reviewed.

3. The method of claim 1, wherein the acknowledgment of knowledge includes an acknowledgment that the at least one patent covers the at least one function.

4. The method of claim 1, further comprising maintaining, based on the access, a store of data comprising at least one of a name, an address, a customer number, an account number, an email address, an internet protocol address or a domain name.

5. The method of claim 4, wherein the maintaining comprises at least one of: storing one or more portions of the data in a first file that is local to the device or transmitting the one or more portions of the data over a network and storing the one or more portions of the data in a second file that is remote from the device.

6. The method of claim 4, wherein the maintaining comprises providing, to a subscriber device, authorized access to the store.

7. The method of claim 1, further comprising:
   searching a patent database; and
   retrieving information associated with the at least one patent from the patent database.

8. The method of claim 7, further comprising:
   displaying the information associated with the at least one patent, wherein the information comprises at least one of text or an image associated with the at least one patent.

9. The method of claim 1, wherein the presenting the notice comprises presenting a patent infringement warning.

10. The method of claim 1, wherein the presenting the notice comprises presenting license information including contact information to determine whether a license has been granted for the access.

11. The method of claim 1, wherein the presenting the notice comprises presenting patent rights holder contact information.

12. A computing device, comprising:
   a comparison module configured to determine a device is an illegal copy of the device as a function of at least one characteristic of the device;
   a presenting module configured to, in response to an attempt to access one or more functions of the illegal copy of the device, display a notice, via an interface of the illegal copy of the device, the notice including an indication that the illegal copy of the device is subject to one or more legal rights based on one or more patents; and
   an access module configured to, based, at least, on receipt of an indication of acknowledgment of the one or more legal rights, grant access to the one or more functions.

13. The computing device of claim 12, wherein the indication of the acknowledgment comprises an indication that the at least one patent has been reviewed.

14. The computing device of claim 12, wherein the indication of the acknowledgment comprises an indication that the at least one patent covers the at least one function.

15. The computing device of claim 12, further comprising a data log module configured to maintain, based on the access, a log of data comprising at least one of a name, an address, a customer number, an account number, an email address, an internet protocol address or a domain name.

16. The computing device of claim 15, wherein the data log module is further configured to at least one of:
- store one or more portions of the data in a log file that is local to the device;
- send the one or more portions of the data over a network and store the one or more portions of the data in a log file that is located on a remote server; or
- send, via a web bug, the one or more portions of the data over the network and store the one or more portions of the data in the log file that is located on the remote server.

17. The computing device of claim 15, wherein the data log module is further configured to provide, to a subscribing device, authorized access to the log of data.

18. The computing device of claim 12, further comprising a database search module configured to:
- search a database of patents to obtain a search result; and
- present, based on the search result, information associated with at least one patent of the one or more patents.

19. A non-transitory computer-readable storage medium comprising computer-executable instructions that, in response to execution, cause a computing system to perform operations, comprising:
- determining a device is an illegal copy of the device including identifying at least one characteristic of the device;
- presenting, via an interface of the illegal copy of the device, a notice indicating that the illegal copy of the device is subject to one or more legal rights based on at least one patent, the presenting being in response to an attempt to access at least one function of the illegal copy of the device; and
- granting access to the at least one function of the illegal copy of the device based, at least, on receiving an indication of an acknowledgement of knowledge of the one or more legal rights.

20. The non-transitory computer-readable storage medium of claim 19, further comprising transmitting, via electronic mail, a copy of the at least one patent to an electronic mail address associated with the attempt to access the at least one function of the device.

21. A computing system, comprising:
- a memory storing computer-executable instructions; and
- a processor, communicatively coupled to the memory, that facilitates execution of the computer-executable instructions to at least:
  - determine a device is an illegal copy of the device as a function of at least one characteristic of the device;
  - identify an attempted access of one or more functions of the illegal copy of the device;
  - display, via a display interface of the illegal copy of the device, a notice having an indication that the illegal copy of the device is subject to one or more patents; and
  - grant the access in response to reception of the acknowledgment.

22. The computing system of claim 21, wherein the processor further facilitates the execution of the computer-executable instructions to:
- perform a comparison of at least one of an allowed identity, an allowed location, a disallowed identity, or a disallowed location, to at least one of an identity associated with the access, or a location associated with the access, and
- limit subsequent access to the one or more functions based on the comparison.

23. A system, comprising:
- means for determining a device is an illegally made copy of the device including means for identifying at least one characteristic of the device;
- means for displaying a notice having a description that the illegally made copy of the device is subject to one or more legal rights based on one or more patents including means for displaying an acknowledgment of the one or more legal rights;
- means for granting access to the function in response to receipt of an indication of an acknowledgement of knowledge of the one or more legal rights.

24. The system of claim 23, further comprising means for determining a geographic location from which the attempt to access originated.

25. The system of claim 24, further comprising:
- means for initiating a sending of a copy of the at least one patent to an address associated with the geographic location from which the attempt to access originated.

* * * * *